Oct. 13, 1925.　　　　　　　　　　　　　　　　　　　1,556,911
W. V. CALLENDER
MEASURING STOPPER FOR BOTTLES
Filed May 6, 1921
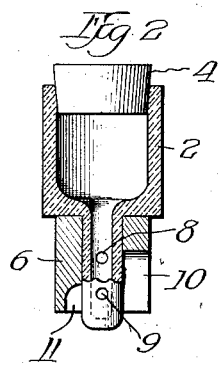
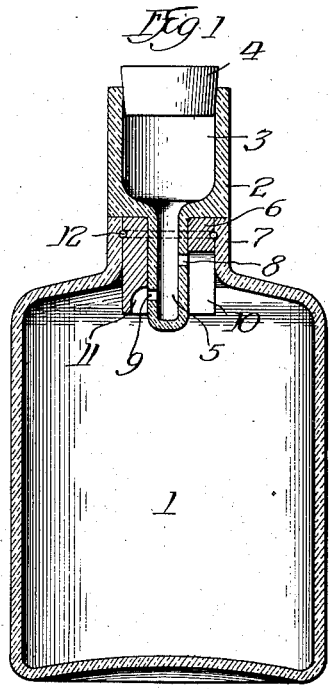
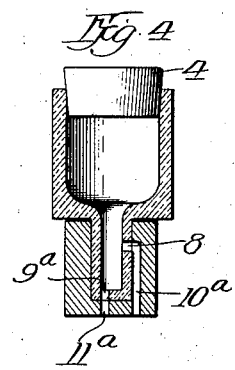
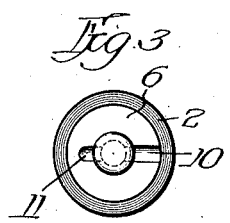
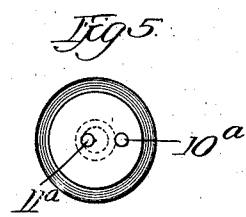
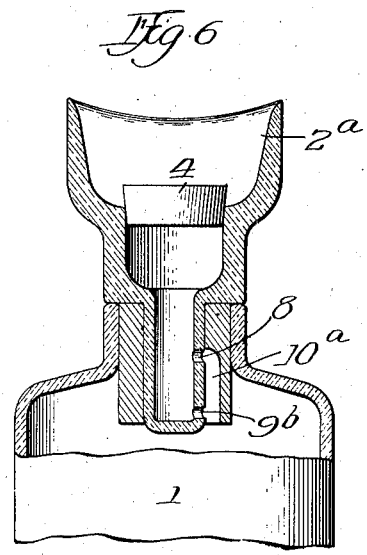
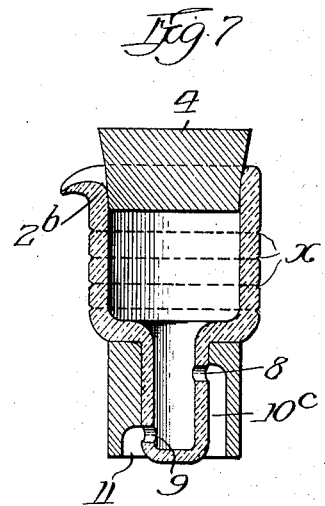
Inventor
Wallace V. Callender Patented Oct. 13, 1925.

1,556,911

UNITED STATES PATENT OFFICE.

WALLACE V. CALLENDER, OF CHICAGO, ILLINOIS.

MEASURING STOPPER FOR BOTTLES.

Application filed May 6, 1921. Serial No. 467,292.

*To all whom it may concern:*

Be it known that I, WALLACE V. CALLENDER, a citizen of the United States, residing at Chicago, in the county of Cook and State of Illinois, have invented certain new and useful Improvements in Measuring Stoppers for Bottles, of which the following is a specification.

One object of the present invention is to provide a stopper for a bottle or other container which is adapted to be brought into communication with the interior of such container to receive a measured quantity of the contents thereof, and thereafter cut off from such communication in order that the measured quantity of contents may be disposed of without releasing more of the contents of the container; and, accordingly, one feature of the invention consists in providing a bottle stopper with a measuring chamber, with a passageway through which the measuring chamber communicates with the interior of the container, and with means for opening and closing such passageway at will.

Another object is to provide a construction of such a measuring stopper which will insure freedom in the flow of the contents into the measuring chamber, and which may be opened and closed by relative movement between the stopper and the container; and, accordingly, another feature of the invention consists in providing the measuring chamber with a hollow stem projecting into the mouth of the container and surrounded by a packing combined therewith in a manner to serve as a valve for opening and closing the passageway.

Still another object of the invention is to provide a stopper for a bottle, or other container, having a chamber to receive a portion of the contents of the container, and so constructed that it will be especially adapted for disposal of the contents of the chamber in the particular manner that may be required in the use for which the device is intended; accordingly, still another feature of the invention consists in constructing the wall of the chamber in various forms, such, for instance, as a mouth-piece conveniently received into the mouth of a patient in administering medicine; an eye cup adapted to fit over the eye of a patient in applying a measured quantity of liquid to the eye; or a pouring cup from which a measured quantity of fluid trapped in the chamber of the stopper may be poured in laboratory work.

Several embodiments of the invention are shown by way of illustration in the accompanying drawing. In said drawing—

Figure 1 is a vertical axial section of a bottle having one form of measuring stopper applied thereto, the parts being in position to establish communication between the bottle and the measuring chamber.

Figure 2 is a detail view of the stopper shown in Figure 1, with the parts in position to shut off communication between the measuring chamber and the bottle.

Figure 3 is an inner end view of the same.

Figure 4 is a view showing a modified construction of passageway for the flow of liquid into the measuring chamber and the escape of air therefrom.

Figure 5 is an inner end view of the construction shown in Figure 4.

Figure 6 is a sectional view showing a measuring stopper combined with an eye cup and with a somewhat modified construction of passage closure; and Figure 7 is a sectional view of a stopper designed for measuring different quantities of liquid in the measuring chamber and dispensing the same by pouring, the form of passage closure corresponding to that shown in Figures 1, 2, and 3.

Referring to Figures 1, 2, and 3, 1 represents a liquid container, for instance, a bottle suitable to contain medicine and 2 represents a measuring stopper therefor. Stopper 2 is provided with a measuring chamber 3 having a removable closure 4 and a filling stem 5 so that it is adapted to receive from the bottle 1 a measured quantity of the contents of the bottle.

Stem 5 is surrounded by a packing or gasket 6 of cork or other suitable material, which fits tightly into the neck 7 of the bottle 1 in a manner to effectually close the bottle against loss of its contents. This gasket constitutes a valve shell and is made to coact with the stem 5 after the manner of a plug valve. To this end, stem 5 is provided with a filling port 8 and an air vent 9, and the gasket 6 is provided with a recess 10 that gives access to the filling port 8 and another recess 11 that opens into communication with the air vent 9. Recesses 10 and 11 are so restricted in dimension in the direction of the circumference of the gasket 6 that rotation of the stopper relatively to the gasket and the bottle 1 will close the port 8 and the vent 9 by bringing them opposite to solid portions of the gasket which receives the stem 5, as, for instance, when the stopper 2 is rotated to the position shown in Figures 2 and 3. Ordinarily the gasket 6, if made with proper dimensions, will remain stationary in the neck 7 during rotation of the stopper 2 because of the greater area of contact between the outer circumference of the gasket and the neck of the bottle than between the inner circumference of the gasket and the stem 5. However, frictional resistance to turning of the gasket 6 in the neck 7 may be increased if desired through means of a rubber or other friction band 12, as shown in Figure 1.

With a stopper constructed as shown in Figures 1, 2 and 3 and applied to a bottle such as 1, the measuring chamber 3 will be promptly filled upon inverting the bottle, whereupon stopper 2 may be rotated to close communication with the interior of the bottle 1, and then turned upright and have its closure 4 removed so that the contents of the measuring chamber may be drunk by using the wall of the chamber as a mouth piece.

If desired, the filling recess that supplies the port 8 may be restricted to a longitudinal bore 10$^a$, as shown in Figures 4 and 5 instead of a complete radial recess as shown in Figures 1, 2, and 3; while vent 9 may be located in the end of the stem 5 and communicate with the interior of the bottle through the bore 11$^a$, as shown in said figures; or the vent may be given the location 9$^b$ and communicate with the same bore 10$^a$ that leads to the port 8 as shown in Figure 7.

Instead of having the wall of the measuring chamber in the form of a mouth piece 2 as shown in Figures 1 and 4, it may be surmounted by an eye cup 2$^a$, as shown in Figure 6; or it may be in the form of a pouring cup 2$^b$, as shown in Figure 7; or a cup, regardless of its particular form, may be provided with measuring graduations $x$, as shown in Figure 7. These will be of particular advantage, however, in a dispensing measure for laboratory work, as suggested in Figure 7.

I claim:

In a bottle stopper having a chamber for measuring a portion of the contents of the bottle, and having a ported stem adapted by rotation in the bottle to bring the chamber into and out of communication with the bottle, a removable closure for the discharge end of the chamber, and a cup formed upon the wall of the chamber and projecting beyond said closure.

Signed at Chicago, Illinois, this 30th day of April, 1921.

WALLACE V. CALLENDER.